United States Patent [19]
Moller et al.

[11] Patent Number: 5,078,035
[45] Date of Patent: Jan. 7, 1992

[54] CIRCULAR SAW BLADE

[75] Inventors: Karl H. Moller, Westlake; Andrew L. Jedick, Avon Lake, both of Ohio

[73] Assignee: Diamond Products, Inc., Elyria, Ohio

[21] Appl. No.: 622,335

[22] Filed: Nov. 28, 1990

Related U.S. Application Data

[63] Continuation of Ser. No. 396,845, Aug. 21, 1989, abandoned.

[51] Int. Cl.⁵ .......................... B26D 1/12; B28D 1/04
[52] U.S. Cl. .................... 83/522.12; 83/676; 83/835; 125/18
[58] Field of Search ............ 83/522.12, 835, 337, 83/495, 676; 446/47; 51/206.4; 125/18

[56] References Cited

U.S. PATENT DOCUMENTS

| | | | |
|---|---|---|---|
| 3,872,763 | 3/1975 | Kayahara | 83/835 |
| 3,959,916 | 6/1976 | Meyer | 446/47 |
| 4,257,301 | 3/1981 | Tuomaula | 83/835 |
| 4,776,251 | 10/1988 | Carter, Jr. | 83/835 |
| 4,821,617 | 4/1989 | Fjelkner et al. | 83/835 |

FOREIGN PATENT DOCUMENTS 3510827 10/1986 Fed. Rep. of Germany ........ 83/835

OTHER PUBLICATIONS

Dry Cutting Diamond Blades—Cushion Cut—undated.
Sankyo Diamond Tools—Sankyo Diamond Industrial Co., Ltd.—undated.
Saidcer Saidtur—Said S.p.a. of Italy—undated.
Astro Laser, Dry-Cutting Diamond Saw Blade—Truco—undated.

*Primary Examiner*—Frank T. Yost
*Assistant Examiner*—Kenneth E. Peterson
*Attorney, Agent, or Firm*—Renner, Otto, Boisselle & Sklar

[57] ABSTRACT

A circular saw blade having an inner drive portion, an outer cutting edge portion, and a plurality of angled slots extending through the blade from the first lateral surface through to the second lateral surface of the blade. The angled slots are radially spaced inboard of the outer cutting edge portion and they are closed and thus do not open to the outer diameter of the saw blade. The angled slots serve to produce an audible signal in the event the saw blade is rotated in the wrong direction of rotation upon a drive unit.

6 Claims, 1 Drawing Sheet

CIRCULAR SAW BLADE

This is a continuation of copending application Ser. No. 07/396,845 filed on Aug. 21, 1989, now abandoned.

DISCLOSURE OF THE INVENTION

The present invention relates to a saw blade for cutting any one of a variety of materials. More particularly, the invention relates to a circular saw blade for use with a high speed drive unit that is capable of rotating the saw blade at a rate in excess of about 4,000 revolutions per minute.

RELATED APPLICATIONS

The subject matter of the present invention relates to design application Ser. No. 07/348,764 filed in the United States Patent and Trademark office by the applicants on May 8, 1989 and entitled Circular Saw Blade or Similar Article.

BACKGROUND

The prior art provides various types of circular saw blades for cutting materials such as steel, concrete, asphalt and the like. In order to properly cut materials, most of these prior art saw blades must be rotated in a particular direction of rotation. More particularly, the cutting edge or teeth are generally oriented or angled such that the saw blades are capable of cutting in only one direction of rotation. Many times, the angle or orientation of the cutting edge or teeth is slight or nonexistent, so it is sometimes not possible to determine the proper direction of rotation by visually inspecting the saw blade. With respect to many prior art saw blades, if the saw blades are rotated in the wrong or opposite direction during the cutting operation, the cutting edge or teeth of the saw blades can be permanently damaged.

In order to avoid rotating circular saw blades in the wrong direction, some prior art blades have included various types of visual indicators that serve to inform the user of the proper direction of rotation. One category of visual indicators commonly utilized are labels placed on the lateral surfaces of the saw blades. Additionally, some prior art saw blades have included markings or arrows that are stamped directly onto the lateral edges of the saw blade. Unfortunately, during cutting operations such labels and markings can be worn away. Thus, when a user proceeds to mount a saw blade on a drive unit wherein such markings are worn away, there is a possibility that the user will improperly mount the saw blade on the drive unit resulting in the saw blade being rotated in the wrong direction, thereby leading to the possibility of damaging the cutting edge of the saw blade when a user attempts to cut material with the improperly mounted saw blade.

The prior art further provides circular saw blades with circular openings in the lateral edges of the blade which serve to generate air flow and cool the cutting edge of the blade. These circular openings are located intermediate the axis of rotation and the cutting edge of the saw blade. In other prior art circular saw blades, openings are provided in the lateral edges of the blade that extend and open from the cutting edge of the blade radially inward towards the axis of rotation. These openings are also designed to provide cooling for the circular saw blade.

SUMMARY OF THE INVENTION

The present invention provides a circular saw blade that creates an audible signal that serves to inform a user that the rotational direction of the saw blade is improper. Such a system of notification is not susceptible to being defaced or worn away during the normal use of the saw blade.

In a preferred embodiment the invention comprises a high speed circular saw blade having a pair of opposed lateral surfaces, an inner driving portion and an outer cutting edge portion. Located between the inner driving portion and the outer edge portion are a plurality of equally spaced angled slots extending through the saw blade from the first lateral surface to the second lateral surface. The angled slots are closed and thus they have continuous edges. Therefore, the angled slots do not open to the outside diameter of the saw blade. The angled slots, in addition to generating air flow for the cooling of the saw blade, also serve to produce an audible signal in the event the saw blade is rotated in the wrong direction of rotation.

More particularly, if the saw blade is mounted on a drive unit such that the major length of the angled slots are oriented towards the direction of rotation, the angled slots produce essentially no audible signal. However, if the saw blade is mounted on a drive unit such that the major length of the angled slots are oriented away from the direction of rotation, the angled slots produce a very loud screech or audible signal that notifies a user that the saw blade is rotating in the wrong direction.

In the preferred embodiment, the angled slots are located proximate the cutting edge portion. Also, the angled slots extend at an angle of about 60° relative to a line extending tangent to the outer diameter of the saw blade. Furthermore, the width of the angled slots equals about one-third the length of the slots.

The foregoing and other features of the invention are hereinafter more fully described and particularly pointed out in the claims, the following description and the annexed drawing setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
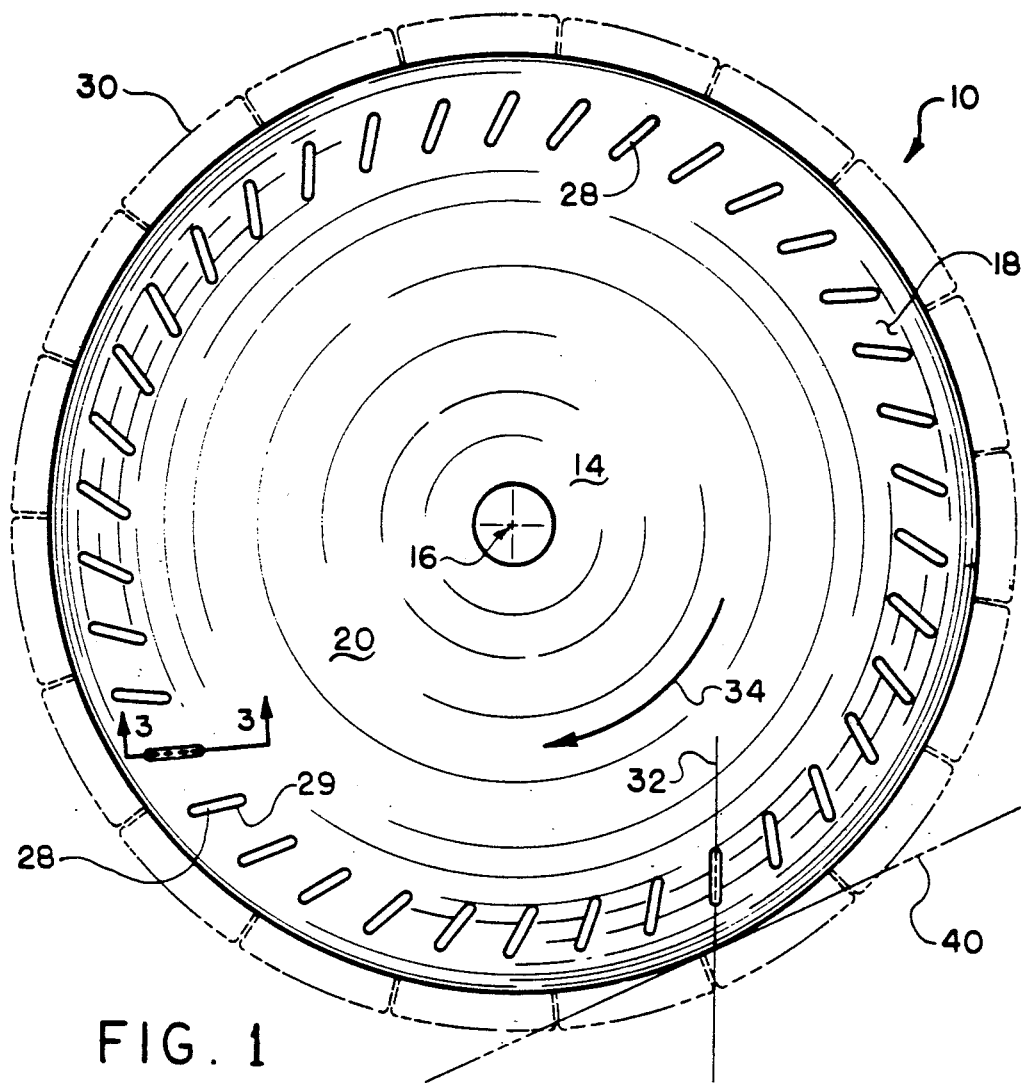
FIG. 1 is a right side view of a circular saw blade made in accordance with the present invention.
Figure 2:
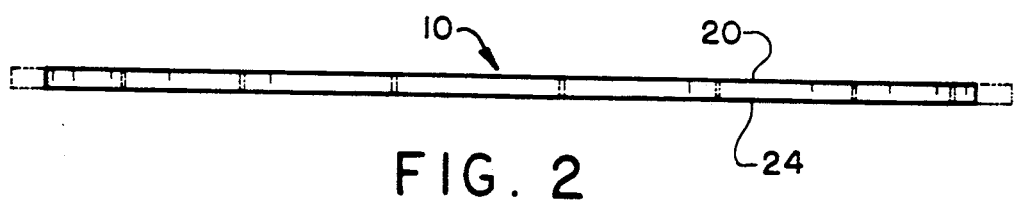
FIG. 2 is a top view of the saw blade of FIG. 1.
Figure 3:
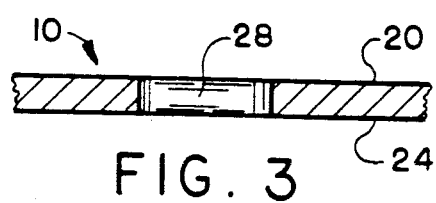
FIG. 3 is a broken away cross-sectional view of the saw blade shown in FIG. 1 taken along line 3—3 thereof.

Referring to the drawings and initially to FIGS. 1 and 2 there is illustrated a circular saw blade 10 made in accordance with the present invention which provides an audible signal in the event a user improperly mounts the saw blade 10 upon a drive unit thereby resulting in the saw blade 10 rotating in the improper direction.

Saw blade 10 may be used in conjunction with any one of a variety of drive units which are capable of rotating saw blade 10 at a speed somewhere in excess of about 4,000 revolutions per minute. Such drive units may comprise, for example, electrical and gas powered hand saws, radial saws, table saws and large portable concrete saws. Saw blade 10 may be produced utilizing any of a variety or combination of materials such as, for example, steel, ceramics, composites, carbide or diamond coatings.

Saw blade 10 includes an inner drive portion 14 which surrounds the axis of rotation generally indicated at 16 and an outer cutting edge portion 18 (schematically shown) that may include any one of a variety of cutting edges or cutting teeth. Saw blade 10 further includes a first lateral surface 20 and an opposed second lateral surface 24. Located between the inner portion 14 and the outer portion 18 are a plurality of angled slots 28 extending through the saw blade 10 from the first lateral surface 20 through to the second lateral surface 24. The angled slots 28 are closed or have continuous outer edges 29. Thus, angled slots 28 do not open to the outside diameter 30 of the saw blade 10.

The angled slots 28 are positioned inboard of and generally proximate to the outer cutting edge portion 18 and they are equally spaced along the circumference of the saw blade 10. The angled slots 28, in addition to generating air flow for the cooling of the saw blade 10, serve to produce an audible signal in the event the saw blade 10 is rotated in the wrong or improper direction of rotation.

More particularly, if the saw blade 10 is mounted on a drive unit such that the major axes or major lengths (generally indicated by a line designated 32) of the angled slots 28 are oriented towards the direction of rotation (generally indicated with arrow 34), the angled slots 28 produce essentially no audible signal. However, if the saw blade 10 is mounted on a drive unit such that the major length 32 of the angled slots 28 are oriented away from the direction of rotation, upon rotation of the saw blade 10 by a drive unit prior to the start of the cutting operation, the angled slots 28 produce a very loud screech or audible signal that notifies a user that the saw blade 10 is rotating in the wrong direction. This notification allows a user to remount the saw blade 10 upon the drive unit prior to the start of the cutting operation thereby avoiding possible damage to the cutting edge or teeth of the saw blade 10.

The major lengths or major axes 32 of angled slots 28 extend at an angle of about 60 degrees relative to a line 40 extending tangent to the outer diameter 30 of the saw blade 10. The width of the angled slots 28 equals approximately one-fourth the length of the angled slots 28.

Although the invention has been shown and described with respect to a preferred embodiment, it is obvious that equivalent alterations and modifications will occur to others skilled in the art upon the reading and understanding this specification. The present invention includes all such equivalent alterations and modifications and is limited only by the scope of the following claims.

What is claimed is:

1. A circular saw blade for rotation in a first direction and an opposite second direction about an axis of rotation for cutting any one of a variety of materials, said saw blade comprising a first lateral surface and an opposed second lateral surface, an inner drive portion and an outer cutting edge portion for cutting materials when said saw blade is rotated in said first direction, and notification means for producing an audible signal when said saw blade is rotated in said second direction and substantially no audible signal when said saw blade is rotated in said first direction, said notification means comprising a plurality of angled slots bounded by continuous outer edges and extending through said saw blade from said first lateral surface through to said second lateral surface, said angled slots being radially spaced inboard of said outer cutting edge portion, each of said angled slots having a major longitudinal axis, each of said major longitudinal axes extending toward said first direction of rotation at about a 60° angle relative to a line extending tangent to the outer diameter of said saw blade at a position most adjacent each of said angled slots.

2. A circular saw blade as set forth in claim 1 wherein said angled slots have a width and a length, said width of said angled slots being substantially constant along substantially the entire length of said angled slots and said width equaling about one-fourth said length of said angled slots.

3. A circular saw blade as set forth in claim 1 wherein said angled slots are equally radially spaced along the circumference of said saw blade.

4. A circular saw blade for rotation in a first direction and an opposite second direction about an axis of rotation for cutting any one of a variety of materials, said saw blade comprising a first lateral surface and an opposed second lateral surface, an inner drive portion and an outer cutting edge portion for cutting materials when said saw blade is rotated in said first direction, and a plurality of equally radially spaced angled slots bounded by continuous outer edges and extending through said saw blade from said first lateral surface through to said second lateral surface, said angled slots having an outboard edge and an inboard edge, said inboard edge being spaced inwardly from said outboard edge and said outboard edge being located proximate said cutting edge portion, said angled slots being radially spaced inboard of said outer cutting edge portion, each of said outboard edges of said angled slots extending toward said first direction of rotation at a 60° angle relative to a line extending tangent to the outer diameter of said saw blade at a position most adjacent to each of said slots, said angled slots producing an audible signal when said saw blade is rotated in said second direction and substantially no audible signal when said saw blade is rotated in said first direction.

5. A circular saw blade as set forth in claim 4 wherein said angled slots have a width and a length, said width of said angled slots being constant along substantially the entire length of said angled slots and said width equalling about one-fourth said length of said angled slots.

6. A circular saw blade for rotation in a first direction and an opposite second direction about an axis of rotation for cutting any one of a variety of materials, said saw blade comprising:
a first lateral surface and an opposed second lateral surface;
an inner drive portion;
an outer cutting edge portion for cutting materials when said saw blade is rotated in said first direction; and
a plurality of equally spaced angled and substantially straight slots bounded by continuous outer edges and located inboard of and proximate to said cutting edge portion, said angled slots having an outboard edge and an inboard edge spaced inwardly from said outboard edge, said outboard edge of said angled slots extending towards said first direction of rotation, said angled slots having both a width and a length, said width of said angled slots equalling about one-fourth said length of said angled slots, each of said angled slots extending at an angle of 60° relative to a line extending tangent to the outer diameter of said saw blade at a position most adjacent to each of said slots, said angled slots producing an audible signal when said saw blade is rotated in said second direction and substantially no audible signal when said saw blade is rotated in said first direction.

* * * * *